United States Patent Office 3,342,826
Patented Sept. 19, 1967

3,342,826
HETEROCYCLIC AMINOALKYL BENZAMIDES
Charles S. Miller, Worcester, and Edward L. Engelhardt, Gwynedd Valley, Pa., and Michel L. Thominet, Paris, France, assignors to Société d'Etudes Scientifiques et Industrielles de l'Ile-de-France, Longjumeau, Seine-et-Oise, France, a French corporation
No Drawing. Filed Jan. 13, 1964, Ser. No. 337,162
11 Claims. (Cl. 260—294)

This invention relates to new benzamido heterocyclic compounds. More specifically, this invention relates to compounds of the formula

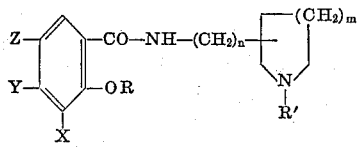

in which R is lower alkyl, X, Y and Z are each hydrogen, halogen, lower alkoxy, nitro, amino, lower alkylamino, di(lower alkyl)amino, lower alkanoylamino, lower acyl, cyano, sulfamoyl, N-lower alkylsulfamoyl, N,N-di(lower alkyl)sulfamoyl, trihalomethyl, lower alkylthio, lower alkylsulfonyl, polyfluoro-lower-alkylthio, or polyfluoro-lower-alkylsulfonyl, R' is lower alkyl or allyl; $m$ is a positive whole number less than 4 (i.e., 1, 2 or 3) and $n$ is a whole number less than 2 and greater than minus one (i.e., zero or one). This invention also contemplates the N-oxides and quaternary salts of these heterocyclic compounds.

We have found that certain (lower alkoxy-benzamido) pyrrolidines and piperidines and hexahydroazepines corresponding to the above formula show a remarkable potency in blocking conditioned avoidance. This is a test which has a remarkably good correlation with clinical activity of tranquilizers as reported in the paper on "Drug Effects on the Behavior of Animals" by Cook and Kelleher in Annals of the New York Academy of Science, volume 96, page 315, 1962. These compounds which form the products of this invention further show great potency in antiemetic tests.

The products of this invention are amides of certain benzoic acids and certain cyclic amines, as discussed below. The aromatic part of the molecule is derived from an o-alkoxybenzoic acid which can have further substituents. These include halogen, alkoxy, nitro, amino, substituted amino (such as alkyl and dialkylamino), acylamino (such as acetylamino, propionylamino, etc.), cyano, sulfamoyl and substituted sulfamoyl (such as alkyl and dialkylsulfamoyl), trihalomethyl such as trichloromethyl, tribromomethyl and trifluoromethyl, lower alkylthio such as methylthio, propylthio and the like, polyfluoro-lower-alkylthio such as trifluoromethylthio and pentafluoroethylthio and polyfluoro-lower-alkylsulfonyl such as trifluoromethylsulfonyl, trifluoroethyl sulfonyl and pentafluoroethylsulfonyl. In order to obtain the activity which we find in the compounds of our invention, it is necessary that there be an ortho lower alkoxy group (ortho, i.e., to the carboxy of the benzoic acid).

In preparing the compounds of this invention, said benzoic acids are used in the form of various derivatives capable of reacting with an amine, such as the N-benzoylimidazole prepared from the acid and either 1,1'-sulfinyldiimidazole or 1,1'-carbonyldiimidazole as a special acylating reagent described later on, or as the acid chloride which can readily be formed from the action of thionyl chloride on the free acid. In addition to the methods described above for activating the carboxyl group, the mixed anhydrides with monoesters of carbonic acid or active esters such as the p-nitrophenyl ester or the cyanomethyl ester of the benzoic acid can be employed.

Benzoic acids which are usable include the following:

2-methoxy-3,5-dichlorobenzoic acid
2-methoxy-3-fluoro-5-chlorobenzoic acid
2-isopropoxy-3,5-dichlorobenzoic acid
2-ethoxy-3,5-dichlorobenzoic acid
2-methoxy-3,5-dibromobenzoic acid
2-methoxy-3-chloro-5-bromobenzoic acid
2-methoxy-3-chloro-5-fluorobenzoic acid
2,5-dimethoxy-3-chlorobenzoic acid
2,5-dimethoxy-3-chlorobenzoic acid
2-methoxy-4,5-dichlorobenzoic acid
2-methoxy-4-aminobenzoic acid
2-methoxy-4-nitrobenzoic acid
2-methoxy-4-amino-5-bromobenzoic acid
2,4-dimethoxy-5-chlorobenzoic acid
2,4,5-trimethoxybenzoic acid
2-methoxy-3,4,5-trichlorobenzoic acid
2-methoxy-4-fluorobenzoic acid
2-methoxy-5-fluorobenzoic acid
2-methoxy-3-nitro-5-chlorobenzoic acid
2,4-dimethoxybenzoic acid
2-methoxy-5-nitrobenzoic acid
2-methoxy-4-chlorobenzoic acid
2-methoxy-4-bromobenzoic acid
2-methoxy-4-fluorobenzoic acid
2-ethoxy-4-chlorobenzoic acid
2-ethoxy-4-bromobenzoic acid
2-ethoxy-4-fluorobenzoic acid
2-ethoxy-5-nitrobenzoic acid
2-methoxy-5-(N-methylsulfamoyl)benzoic acid
2-methoxy-5-sulfamoylbenzoic acid
2-methoxy-4-acetamido-5-chlorobenzoic acid
2-methoxy-5-sulfamoylbenzoic acid
2-methoxy-4-ethylamino-5-chlorobenzoic acid
2-methoxy-4-acetamido-5-chlorobenzoic acid
2-methoxy-4-(N-ethylacetamidobenzoic)acid
2-methoxy-4-diethylaminobenzoic acid
2-methoxy-5-trifluoromethylbenzoic acid
2-methoxy-3-nitro-5-trifluoromethylbenzoic acid
2-methoxy-3-acetamido-5-trifluoromethylbenzoic acid
2-methoxy-3-bromo-5-trifluoromethylbenzoice acid
2-methoxy-3-chloro-5-trifluoromethylbenzoic acid
2-methoxy-4-trifluoromethylbenzoic acid Many of these benzoic acids are well known in the literature, e.g., French Patent 1525M. Others are new compounds, whose preparations follow standard procedures. Some of the new compounds, especially those having trifluoromethyl groups, are difficult to prepare and are claimed in other applications.

In the case of the aminobenzoic acid derivatives, such as 2-methoxy-3-amino-5-bromo or chlorobenzoic acids and the corresponding non-halogenated compounds, the amino group is protected by acylation during the formation of the amide linkage or the corresponding nitro acid is used in the condensation with the heterocyclic amine and the nitro group is reduced to amino after the amide formation. The nitrobenzoic acids are formed from o-toluidine by nitration to 2-amino-4-nitrotoluene or the corresponding 5-halogen compound (if the o-toluidine is first halogenated). The nitrotoluene is first converted to 2-hydroxy-4-nitrotoluene by diazotization followed by hydrolysis of the diazonium salt. Dimethylsulfate then is used to convert this to 2-methoxy-4-nitrotoluene which is oxidized with potassium permanganate to produce 2-methoxy-4-nitrobenzoic acid or its 5-halogenated derivative. The nitro acid is then condensed with the heterocyclic amine by any of the methods discussed below. Alternatively, the nitrobenzoic acid can be reduced to the aminobenzoic acid and acylated. The acyl group is then removed after the amide formation. The corresponding 2-methoxy-5-nitrobenzoic acid is obtained by nitration of the methyl ether of salicyclic acid and is used in the same way.

Other benzoic acid derivatives used in this invention include 2-methoxy-5-ethylthiobenzoic acid (prepared by the reaction of diethylsulfate with 2-methoxy-5-mercaptobenzoic acid), 2-methoxy-5-ethylsulfonylbenzoic acid (prepared by the permanganate oxidation of the ethylthio compound), 2-methoxy-5-ethylsulfinylbenzoic acid (prepared by the periodate oxidation of the ethylthio compound) and 2-methoxy-4-dimethylsulfamoylbenzoic acid (prepared by methylation of 4-dimethylsulfamoylsalicylic acid).

The trifluoromethylbenzoic acid intermediates, claimed elsewhere, are prepared by different methods. Those with the trifluoromethyl in the 5-position are prepared from 2-chloro-5-trifluoromethylaniline by conversion through the nitrile to 2-chloro-5-trifluoromethylbenzoic acid. The chlorine is replaced by methoxyl by reaction of the methyl ester with sodium methoxide followed by saponification of the ester to give 2-methoxy-5-trifluoromethylbenzoic acid, one of the more valuable acid components. This can be nitrated to the corresponding 3-nitro acid which can be reduced to the 3-amino acid. This amino group can be replaced by halogen by the Sandmeyer reaction to give the corresponding 3-bromo or chloro acids. All these are valuable intermediates.

The 2-methoxy-4-trifluoromethylbenzoic acid component is prepared from 4-trifluoromethylbenzoic acid. Nitration to 2-nitro-4-trifluoromethylbenzoic acid, reduction to the 2-amino acid, conversion of the amino acid to the 2-chloro acid by the Sandmeyer reaction, and reaction of its ester with sodium methoxide followed by saponification gives the 2-methoxy-4-trifluoromethylbenzoic acid.

In all of the above preparations, when another sodium lower alkoxide such as sodium ethoxide, propoxide, isobutoxide, etc. is used in place of the sodium methoxide to replace the 2-chloro substituent, the corresponding 2-lower alkoxy compound is obtained.

The benzoic acids listed above are condensed with various cyclic amines. These amines consist primarily of five, six and seven-membered saturated heterocycles having one annular nitrogen and containing the amino substituent, either directly attached to the ring or in the form of an aminomethyl side chain. The annular nitrogen further bears a lower alkyl or an allyl substituent. Examples of such amines include 1-ethyl-2-aminomethyl pyrrolidine, 1-ethyl-3-aminopiperidine, 1-ethyl - 2 - aminomethylpiperidine, 1-methyl-3-aminomethylpiperidine, 1-methyl-2-aminomethylpyrrolidine, 1-ethyl-3-aminopyrrolidine, 1-ethyl-4-aminopiperidine and the like.

These amino and aminomethyl heterocyclic components of the compounds of this invention are partly known in the literature, especially 1-ethyl-2-aminomethylpyrrolidine, 1-ethyl-3-aminopiperidine and 1-ethyl-2-aminomethylpiperidine. Others are readily prepared by known reactions, e.g., 1-ethyl-3-aminopyrrolidine is prepared by the action of thionyl chloride on 1-ethyl-3-hydroxypyrrolidine and ammonolysis of the resulting 3-chloro compound under pressure. The other corresponding 1-lower alkyl compounds and 1-allyl compounds are prepared from the corresponding 1-lower alkyl or allyl intermediates by the reactions used to prepare the above 1-ethyl compounds.

The reaction of these o-alkoxy benzoic acids with the heterocyclic amines is carried out using a variety of methods of converting the carboxyl group to an active acylating agent. The usual amide formation by reaction of the amine with an acid chloride can be used, the acid chlorides being obtained by the action of thionyl chloride on the acid. Preferably, the carboxyl is converted to other types of acylating reagent, in order to reduce the formation of by-products. The most advantageous reagent is the N-acyl imidazole which is formed from the free acid and 1,1'-sulfinyldiimidazole [Angew. Chem., 73 26, 435, (1961)] or from the free acid and 1,1'-carbonyldiimidazole [J. Am. Chem. Soc., 82 4596 (1960)]. The former method is preferred. Another useful acylating agent, preferred over the acid chloride, is that described by Woodward [J. A. C. S., 83 1010 (1961)] which is formed by treating the acid with an isoxazolium salt according to the equation:

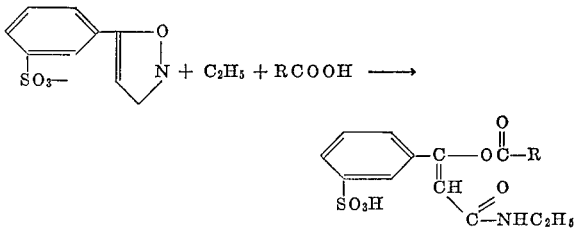

In the preparation of the compounds of this invention, the acylating reagent is condensed with the aminoheterocyclic compound in an inert solvent in the presence of an acid acceptor. The acid acceptor can be an organic base such as a teritary amine (e.g., triethylamine, dimethylaniline, pyridine, picoline and the like). The acid acceptor can also be any inorganic acid acceptor, such as calcium carbonate, sodium carbonate and the like. The inert solvent can be any solvent inert to amines and to the acylating reagent, such as benzene, toluene, tetrahydrofuran, acetonitrile, dioxane and the like. Also, when the acylating reagent is the acid chloride, the organic base used as the acid acceptor can itself be the solvent, when used in sufficient amounts. When the acylating agent is the Woodward reagent described above, a stoichiometric quantity of an acid acceptor such as triethylamine is desirable. When employing the N-acyl imidazole, one uses enough triethylamine to react with the halogen ion released when the reagent has been prepared from thionyl chloride and imidazole. When the reagent is prepared from 1,1'-carbonyldiimidazole, the preparation is in benzene in order to be able to remove the insoluble imidazole hydrochloride by-product before acylation. All these reagents are then used at room temperature or up to 50° in inert solvents such as those mentioned above as well as others like dimethylformamide which are also inert to both reactants.

Since the compounds of this invention possess one or more asymmetric carbons, they can be resolved by any of the standard known methods into two or more enantiomorphs. In some cases the biological activity may be greater in one enantiomorph than in the others.

The substituted benzamides of this invention are used as antiemetics and in the treatment of mental diseases. Oral dosages are 3 to 150 mg. daily in 4 to 6 spaced doses. Parenterally, one uses two to 100 mg. daily in 4 to 6 spaced doses. The compounds can be used in the form of sugar-coated tablets of 10–25 mg. each, in injectible ampules or solutions for aerosol or other sprays in concentrations of about 50 mg. per cc. in the form of suppositories of 50–100 mg. or in syrups, capsules or other usual forms. They may be mixed with any of the standard pharmaceutical compounding agents, such as stabilizers, sequestering agents, buffers, and the like. For medicinal purposes the compounds of this invention can be used in the form of salts of pharmaceutically acceptable acids such as hydrochloric, hydrobromic, phosphoric, sulfuric, maleic, tartaric, salicylic, citric and the like.

This invention can be illustrated by the following examples in which temperatures are degrees centrigrade unless otherwise specified.

EXAMPLE 1

*1-ethyl-2-(3,5-dichloro-2-methoxybenzamidomethyl) pyrrolidine*

3,5-dichloro-2-methoxybenzoylchloride (9.58 g. 0.04 m.), 1-ethyl-2-aminomethylpyrrolidine (5.13 g. 0.04 m.) and 50 cc. dried triethylamine are mixed in a flask fitted with a magnetic stirrer and a calcium chloride tube, and immersed in a cold water bath. When the initial heat evolved is dissipated the mixture is allowed to stir overnight at room temperature. After about 24 hours of stirring at room temperature, the mixture is warmed and stirred at 50–60° on a waterbath for two hours. A white solid is filtered and discarded. The triethylamine is evaporated from the filtrate under reduced pressure and alcohol is added and removed under reduced pressure twice. Benzene is then added to the residue twice and removed under reduced pressure. The residue is dissolved in ether, excess alcoholic hydrochloric acid is added, followed by more ether. The oil that precipitates is separated by decantation and washed with fresh ether until it solidifies—weight 9.62 g., M.P. 117–120°. The light yellow solid is dissolved in a minimum of hot isopropyl alcohol and fractionated into two crystalline solids by slow addition of ether.

The first fraction melts at 159–160° and is recrystalized from ethyl alcohol-ether to a constant melting point of 178–179° C. dec. Anal. Calcd. for $C_{15}H_{21}O_2N_2Cl_3$; C, 48.99; H, 5.76; N, 7.62; Cl, 28.93. Found after drying in vacuo/$P_2O_5$ at 140° for four hours, C, 48.91; H, 6.13; N, 7.79; Cl, 28.62. The second fraction obtained from the fractionation melts at 128–9° and is recrystallized to a constant melting point of 132–3° from isopropyl alcohol-ether. Anal. Calcd. for $C_{15}H_{21}O_2N_2Cl_3$; C, 48.99; H, 5.76; N, 7.62; Cl, 28.93. Found after drying in vacuo/$P_2O_5$ at 110° for four hours: C, 49.01; H, 5.82; N, 7.56; Cl, 28.70.

N - (1 - ethyl - 3 - piperidyl)-3,5-dichloro-2-methoxybenzamide is prepared from 3,5-dichloro-2-methoxybenzoylchloride and 3-amino-1-ethylpiperidine by the procedure described in Example 1. Melting point 175–6° dec. A mixed melting point of this material and the compound from the first fraction in Example 1 is 176–7° dec. indicating the material to be identical. The infrared spectra of these materials also are identical. Anal. found after drying in vacuo/$P_2O_5$ for six hours at 110° C; C, 48.69; H, 6.02; N, 7.43.

The N.M.R. spectrum of the product from the second fraction is consistent with the 1-ethyl-2-(3,5-dichloro-2-methoxybenzamidomethyl)-pyrrolidine structure. It is not known whether the aminomethyl pyrrolidine starting material is impure or whether a rearrangement occurs during the amide formation.

EXAMPLE 2

*1-ethyl-2-(4-amino-5-chloro-2-methoxybenzamido-methyl)pyrrolidine*

Crude 1-ethyl-2-(4-acetamino-5-chloro-2-methoxybenzamidomethyl)pyrrolidine (34.76 g.–approx. 0.08 m.) prepared by the procedure of Example 1 from 4-acetylamino - 5 - chloro - 2 - methoxybenzoylchloride and the amine), 150 cc. of ethyl alcohol and 105 cc. of 10% sodium hydroxide are mixed and refluxed for 35 minutes. Most of the alcohol is removed under reduced pressure and the resulting oily solid filtered—weight 26.44 g. The solid is dissolved in hot benzene (an insoluble residue) treated with charcoal and filtered. While crystals of 1-ethyl-2-(4-amino-5-chloro-2 - methoxybenzamidomethyl) pyrrolidine (11.98 g.—M.P. 135–6°) result. These are recrystallized to constant M.P. of 141.5–142.5° from hot isopropyl alcohol. Anal. Calcd. for $C_{15}H_{22}O_2N_3Cl$; C, 57.78; H, 7.11; N, 13.48; Cl, 11.38. Found after drying in vacuo/$P_2O_5$ at 110° for 3 hours: C, 57.74; H, 6.89; N, 13.38; Cl, 11.47. Structure verified by N.M.R.

The monohydrochloride is prepared by dissolving 2.8 g. of the base in a minimum of hot isopropyl alcohol and adding 1.75 ml. of 4.802 molar alcoholic hydrochloric acid, followed by slow addition of ether—weight 2.6 g. M.P. 175–6°. Anal. Calcd. for $C_{15}H_{23}O_2N_3Cl_2$; C, 51.73; H, 6.66; N, 12.07; Cl, 20.36. Found after drying in vacuo/$P_2O_5$ at 110° for 4 hours; C, 51.54; H, 6.80; N, 11.86; Cl, 20.08.

EXAMPLE 3

*1-ethyl-2-(5-nitro-2-methoxybenzamidomethyl) pyrrolidine*

Imidazole (25.6 g.–0.376 m.) is dissolved in 250 cc. of dry benzene by heating in a flask filled with a magnetic stirrer and calcium chloride tube. To the hot solution is added phosgene (10.0 g.–0.101 m.) in 100 cc. of benzene with stirring. Stirring is continued until the mixture cools. After standing overnight, the flask is warmed in a water bath at 50–60° for one hour with stirring. The insoluble imidazole hydrochloride is filtered under a dry $N_2$ atmosphere while the solution is hot. The filtrate is evaporated almost to dryness under reduced pressure and 150 cc. of dry tetrahydrofuran is added, followed by 5-nitro-2-methoxybenzoic acid (9.7 g.–0.047 m.). Stirring at room temperature under $CaCl_2$ tube protection proceeds for one-half hour during which $CO_2$ is evolved. 1-ethyl-2-aminomethyl pyrrolidine (13.04 g.–0.1017 m.) is added all at once—with stirring and cold water bath cooling. After stirring for 1½ hours at room temperature the tetrahydrofuran is removed under reduced pressure and warm water (35°) bath. Water (250 cc.) is added to the residue and after stirring for two hours the yellow insoluble solid is filtered, washed with water and dried—weight 12.67 g. M.P. 100–101.5°—percent yield 87.7. After repeated recrystallization by dissolving in benzene at room temperature and slowly adding cyclohexane, the product melts at 108.5–109.5°. A mixed M.P. with material prepared from 5-nitro-2-methoxybenzoylchloride and 1-ethyl - 2 - aminomethylpyrrolidine in triethylamine indicates the samples to be identical. The structure of the compound is verified by N.M.R. studies. The product (2.0 g.) is dissolved in 500 cc. of ether, filtered by gravity and the filtrate treated by dropwise addition of alcoholic hydrochloric acid with stirring until no further precipitation results. The white hydrochloride is filtered, washed with ether and dried at 110° in vacuo/$P_2O_5$ for two hours for analyses. Calcd. for $C_{15}H_{22}O_4N_3Cl$; C, 52.40; H, 6.45; N, 12.22; Cl, 10.31. Found: C, 52.00; H, 6.60; N, 12.14; Cl, 10.44.

The filtrate from the first benzene-cyclohexane recrystallization is evaporated to dryness and the residue dissolved in ethyl alcohol. Excess oxalic acid is added and the mixture fractionated by slow addition of ether. The second fraction is found to be the oxalate of 1-ethyl-2-(5-nitro-2-methoxybenzamidomethyl)pyrrolidine. The first fraction is purified by repeated recrystallizations from ethyl alcohol—M.P. 169–170°. A mixed M.P. with authentic 1-ethyl-3-(5-nitro - 2 - methoxybenzamido)piperidine is undepressed and I.R. curves on the two samples are identical.

EXAMPLE 4

5-nitro-2-methoxybenzoylchloride (9.65 g.–0.0448 m.) is added in small portions to a solution of 1-ethyl-2-aminomethylpyrrolidine (6.5 g.–0.05 m.) in 50 cc. of triethylamine with stirring and $CaCl_2$ tube protection. Stirring is continued at room temperature overnight (18 hours). With stirring, the mixture is heated for two hours in a water bath at 50°. After cooling, a yellow solid is filtered and dissolved in a mixture of ether (300 cc.) and water. The ether layer is separated and washed seven times with 150 cc. portions of water, dried over $MgSO_4$, filtered and the ether evaporated to leave 5.15 g. of an oily yellow solid. The yellow solid is purified by repeated recrystallizations from benzene by slow addition of petroleum ether— M.P. 107.5–108°. Anal. Calcd. for $C_{15}H_{21}O_4N_3$: C, 58.62; H, 6.89; N, 13.67. Found after drying at 80° in vacuo/$P_2O_5$ for three hours: C, 58.93; H, 6.91; N, 13.57.

The mother liquors from the recrystallizations are combined and evaporated to dryness. The remaining solid is dissolved in ethyl alcohol and treated with excess oxalic acid. The resulting oxalate is recrystallized to a constant M.P. of 169–170° dec. Anal. Calcd. for $C_{17}H_{23}N_3O_8$: C, 51.38; H, 5.83; N, 10.57. Found after drying at 110° in vacuo/$P_2O_5$ for four hours: C, 51.51; H, 5.96; N, 10.50.

This material is found to be identical to the oxalate of an authentic sample of 1-ethyl-3-(5-nitro-2-methoxybenzamido)piperidine by mixed M.P. and I.R.

EXAMPLE 5

*1-ethyl-2-(5-bromo-2-methoxybenzamidomethyl) pyrrolidine*

5-bromo-2-methoxybenzoylchloride (8.9 g.–0.0396 m.) is added to triethylamine (90 cc.) in a 250 cc. flask fitted with a magnetic stirrer and a calcium chloride tube. To the mixture is added 1-ethyl-2-aminomethylpyrrolidine (5.2 g.–0.046 m.) with stirring. The mixture heats up and is cooled in a water bath and allowed to stir overnight at room temperature. The reaction mixture is warmed at 50–55° for two hours and cooled. A white precipitate of triethylamine hydrochloride is filtered and discarded. The filtrate is evaporated to dryness under reduced pressure to leave a yellow oil. The yellow oil is dissolved in hot methyl alcohol and oxalic acid (7.2 g.–0.08 m.) dissolved in methyl alcohol is added. On cooling, crystals form. The crystals are filtered and dried—M.P. 181–2° and the filtrate saved. Repeated recrystallizations of the crystals from methyl alcohol or ethyl alcohol gives a product of constant melting point of 192–3°. Analysis calculated for $C_{17}H_{33}O_6N_2Br$: C, 47.34; H, 5.37; N, 6.50; Br, 18.53. Found after drying in vacuo/$P_2O_5$ for three hours at 110° C.: C, 47.17; H, 5.15; N, 6.38; Br, 18.49. Mixed melting point with an authentic sample of 1-ethyl-3-(5-bromo-2-methoxybenzamido)piperidine oxalate indicates the two substances to be identical as does the I.R. spectra.

The methyl alcohol filtrate from the original crystalline oxalate is diluted slowly with ether and gives crystals that melt at 128–9°. This material is recrystallized to a constant melting point of 144–5° dec. Analysis calculated for $C_{17}H_{33}O_6N_2Br$: C, 47.34; H, 5.37; N, 6.50; Br, 18.53. Found after drying in vacuo/$P_2O_5$ for 2½ hours at 110° C.: C, 47.10; H, 5.34; N, 6.42; Br, 18.43. N.M.R. studies indicate this material to be the desired pyrrolidine derivative.

EXAMPLE 6

The procedure of Example 3 is followed using equivalent quantities of the following acids in place of 2-methoxy-5-nitrobenzoic acid:

2-methoxy-3-fluoro-5-chlorobenzoic acid
2-isopropoxy-3,5-dichlorobenzoic acid
2-ethoxy-3,5-dichlorobenzoic acid
2-methoxy-3,5-dibromobenzoic acid
2-methoxy-3-chloro-5-bromobenzoic acid
2-methoxy-3-chloro-5-fluorobenzoic acid
2,5-dimethoxy-3-chlorobenzoic acid
2,5-dimethoxybenzoic acid
2-methoxy-4,5-dichlorobenzoic acid
2-methoxy-4-nitro-5-bromobenzoic acid
2,4-dimethoxy-5-chlorobenzoic acid
2,4,5-trimethoxybenzoic acid
2-methoxy-4-fluorobenzoic acid
2-methoxy-3-nitro-5-chlorobenzoic acid
2-methoxy-5-methylsulfamoylbenzoic acid
2-methoxy-5-ethylsulfamoylbenzoic acid
2-methoxy-5-sulfamylbenzoic acid
2-methoxy-4-N-acetylethylaminobenzoic acid
2-methoxy-4-diethylaminobenzoic acid
2-methoxy-5-trifluoromethylbenzoic acid
2-methoxy-3-nitro-5-trifluoromethylbenzoic acid
2-methoxy-5-mercaptobenzoic acid
2-methoxy-5-ethylthiobenzoic acid
2-methoxy-5-ethylsulfonylbenzoic acid
2-methoxy-3-chloro-5-trifluoromethylbenzoic acid
2-methoxy-3-bromo-5-trifluoromethylbenzoic acid
2-methoxy-4-trifluoromethylbenzoic acid The corresponding 1-ethyl-2-benzamidomethyl pyrrolidine is obtained in each case.

EXAMPLE 7

The procedure of Example 3 is followed, using the following amino compounds in stoichiometrically equivalent quantities in place of the 1-ethyl-2-amino methyl pyrrolidine, to give the correspondingly substituted 5-nitro-2-methoxybenzamide:

1-ethyl-2-aminomethylpiperidine
1-methyl-3-aminomethylpiperidine
1-methyl-3-aminomethylpyrrolidine
1-ethyl-4-aminopiperidine
1-ethyl-3-aminopiperidine

EXAMPLE 8

*1-methyl-2(2-methoxy-5-nitrobenzamidomethyl) pyrrolidine*

Imidazole (1.7 g.–0.025 m.) is dissolved in 25 cc. of dry tetrahydrofuran contained in a 50 cc. 3-necked flask equipped with a magnetic stirrer and calcium chloride drying tube. Thionyl chloride (0.74 g.–0.00628 m.) is added dropwise to the solution and the mixture allowed to stir at room temperature for ½ hour. 2-methoxy-5-nitrobenzoic acid (0.99 g.–0.005 m.) is now added and the mixture stirred for one hour at 25° C. and ½ hour at 50° C. The mixture is cooled to room temperature and dry triethylamine (1.01 g.–0.01 m.) added. The mixture is stirred for ½ hour at 50° C. and cooled to room temperature. 2-aminomethyl-1-methylpyrrolidine (1.14 g.–0.01 m.) is added and the mixture stirred for ½ hour at room temperature followed by ½ hour at 50° C.

The mixture is filtered and the filtrate evaporated to dryness under reduced pressure. The residue is dissolved in a minimum of water and the solution treated with excess 5% NaOH solution. On chilling, a yellow oil separates which is caused to crystallize by working—weight 1.35 g. M.P. 118.5–120°. The solid is dissolved in boiling benzene, filtered and cooled. Petroleum ether is added to the warm benzene slowly and yellow crystals separate. Repeated recrystallization from benzene-petroleum ether yields material of M.P. 121–122° C. Analysis calculated for: $C_{14}H_{19}O_4N_3$: C, 57.32; H, 6.53; N, 14.33. Found: C, 57.39; H, 6.61; N, 14.38.

EXAMPLE 9

*1-ethyl-3-(2-methoxy-5-nitrobenzamido)pyrrolidine*

Woodward's reagent (2.53 g.–0.01 m.) and anhydrous acetonitrile (20 cc.) are placed in a 100 cc. three-necked flask equipped with a magnetic stirrer, addition tube, thermometer and calcium chloride tube. A solution of 2-methoxy-5-nitrobenzoic acid (1.97 g.) 0.01 m., anhydrous triethylamine (1.01 g.–0.01 m.) and anhydrous tetrahydrofuran (20 cc.) is placed in the addition tube. A salt ice-bath is used to chill the contents of the flask to >0° and the contents of the addition tube are added dropwise over 15 minutes with stirring. After stirring at 0° for one hour, the flask is allowed to come to room temperature and stirred for one hour. The contents of the flask are again chilled to 0° and 3-amino-1-ethylpyrrolidine (1.43 g.–0.0125 m.) is added. Stirring is continued at 0° for one hour and then allowed to stir at room temperature for two hours.

The solvents are removed under reduced pressure and water (25 cc.) is added to the residue. Sodium hydroxide solution (10 cc. of 1 N) is added and the mixture extracted four times with methylene dichloride. The combined extracts are dried over magnesium sulfate, filtered and the solvent removed from the filtrate under reduced pressure to leave 2.3 g. of a heavy red oil. The oil is dissolved in hot ethyl alcohol and oxalic acid (0.9 g.) is added to convert the product into the oxalate. Slow addition of ether to the mixture precipitates a crude oxalate which is fractionated from impurities by repeated recrystallizations from isopropyl alcohol and ethyl alcohol—M.P. dec. 181°. Anal. Calcd. for $C_{16}H_{21}O_8N_3$: C, 50.13; H, 5.53; N, 10.96. Found after drying in vacuo/$P_2O_5$ for three hours at 110° C.: C, 50.39; H, 5.78; N, 10.92.

EXAMPLE 10

*Preparation of new benzoic acid intermediates*

(A) *2-methoxy-5-ethylthiobenzoic acid.*—Diethyl sulfate, 0.47 g. (0.0030 mole) is added to a stirred solution of 0.50 g. (0.00272 mole) of 2-methoxy-5-mercaptobenzoic acid and 0.24 g. (0.0060 mole) of sodium hydroxide in 150 ml. of water. After stirring at room temperature for 3 hours, the reaction mixture is acidified mith dilute hydrochloric acid. The yellow oil is extracted with ethyl ether which is then washed with water and dried over anhydrous sulfate. Removal of the ethyl ether solvent under vacuum gives 0.50 g. of crude product, M.P. 53–60°. Recrystallization from a benzene-hexane mixture gives a 2-methoxy-5-ethylthiobenzoic acid, M.P. 58.0–60.0°. Anal. Calcd. for $C_{10}H_{12}O_3S$: C, 56.58; H, 5.70. Found: C, 56.30; H, 5.64.

(B) *2-methoxy - 5 - ethylsulfonylbenzoic acid.*—Potassium permanganate, 8.70 g. (0.055 mole) is added over 0.5 hours to a stirred mixture of 8.80 g. (0.0414 mole) of 2-methoxy-5-ethylthiobenzoic acid and 120 ml. of water to which has been added a spatula tip of potassium carbonate. The reaction mixture is then stirred and heated on the steam bath for 0.5 hours. Several additional small portions of potassium permanganate are added until the permanganate color does not disappear after one hour heating on the steam bath. Excess potassium permanganate is destroyed by the addition of ethanol. The reaction mixture is filtered through supercel, acidified with dilute hydrochloric acid and cooled. The sulfone is removed by filtration and dried to give 2-methoxy-5-ethylsulfonybenzoic acid as a white solid, M.P. 124.5–125.5°. Recrystallization from a benzene-hexane mixture does not change the melting point. When the aqueous reaction mixture filtrate is concentrated on the steam bath under vacuum until white solid precipitates additional product. M.P. 124.0–125–5° (softens, 121.5°) is obtained by extraction with chloroform. Anal. Calcd. for $C_{10}H_{12}O_5S$: C, 49.17; H, 4.95. Found: C, 49.40; H, 5.15.

(C) *2-methoxy-5-methylsulfinylbenzoic acid.*—A solution of 5 ml. of methanol and 5.2 ml. of a 0.5 molar solution of sodium metaperiodate in water is stirred and cooled in an ice bath while 0.50 g. (0.00252 mole) of 2-methoxy-5-methylthiobenzoic acid is added over ten minutes. After stirring at 0° for four hours, an additional 5 ml. of methanol is added and the solution allowed to stand at room temperature for 3 days. The reaction mixture is diluted with water and extracted with chloroform. The chloroform extract is dried over anhydrous sodium sulfate, filtered and concentrated to a clear colorless oil which slowly solidifies. Recrystallization from a benzene-hexane mixture gives the sulfoxide, M.P. 118.5–121.0°. Further recrystallization from the same solvent system gives an analytical sample, M.P. 119.5–121.5°. Anal. Calcd. for $C_9H_{10}O_4S$: C, 50.44; H, 4.70. Found: C, 51.03; H, 5.02.

(D) *2-methoxy-5-trifluoromethylbenzoic acid*

(i) *2-chloro-5-trifluoromethylbenzoic acid.*—Chloro-3-cyanobenzotrifluoride (50 g.) and 63% $H_2SO_4$ (465 ml.) are heated to 152° over a 15-minute period and held at 152°±1° for 22 minutes. This reaction mixture is then poured onto ice and filtered. The white solid is then washed with water and extracted with benzene. The benzene is washed twice with 75 ml. portions of saturated sodium bicarbonate solution. This extract is then made acid (pH 3) and extracted with benzene. The crude product results when the benzene is removed. After recrystallization from hexane the M.P. is 92.5–93.5 (30.5 g.). Anal. Calcd. for $C_8H_4ClF_3O_2$ (mol. wt. 244.577): C, 42.77; H. 1.80. Found: C, 43.46; H, 1.99.

(ii) *2-chloro - 5 - trifluoromethylbenzoic acid methyl ester.*—2-chloro-5-trifluoromethylbenzoic acid (10 g.) is dissolved in a 1:1 mixture of methanol and ether (20 ml.) and to this is slowly added an ethereal diazomethane soda (0.44 m.). After 10 minutes at room temperature, the solvent is removed on a steam bath. The resultant oil is not purified before use in the next step.

(iii) *2-methoxy - 5 - trifluoromethylbenzoic acid.*—The crude 2-chloro-5-trifluoromethylbenzoic acid methyl ester is added to an alcoholic solution of sodium methoxide [0.2 m. Na dissolved in 100 ml. of dry methanol (MeOH)] and refluxed for 60 hours. Water (27 ml.) is then added and refluxing is continued for 20 minutes. The reaction mixture is evaporated to almost dryness and water (10 ml.) added. The mixture is made acid (pH 3) and the crude 2-methoxy-5-trifluoromethylbenzoic acid filtered off. After recrystallizing from hexane, the M.P. is 103.5°. Anal. calcd. for $C_9H_7F_3O_3$ (ml. wt. 220.155): C, 49.19; H, 3.21. Found: C, 49.98; H, 3.26.

(E) *2-methoxy-3-nitro-5-trifluoromethylbenzoic acid*

2-methoxy-5-trifluoromethylbenzoic acid (5.92 g., 0.27 m.) is dissolved in fuming $H_2SO_4$ (27.8 g. 26–23%) and nitric acid (6.85 g., 90%) is added dropwise with stirring to this. The temperature rises to 55° and is held during the addition of the acid (55 minutes). The reaction mixture is poured onto ice, filtered, and recrystallized from $H_2O$ to yield 2-methoxy-3-nitro-5-trifluoromethylbenzoic acid (M.P. 141–2). Anal. calcd. for $C_9H_6F_3NO_5$ (mol. weight 265.155): C, 40.78; H, 2.28; N, 5.28. Found: C, 41.07; H, 2.32; N, 5.41.

(F) *2-methoxy-3-amino-5-trifluoromethylbenzoic acid*

2-methoxy-3-nitro-5-trifluoromethylbenzoic acid (2 g. 0.0076 m.) is dissolved in acetic acid (20 ml. glacial and platinum oxide) (200 mg.) is added to this. The reaction mixture is then reduced using the Hershberg apparatus, filtered under $N_2$ through a pad of supercel and then evaporated to dryness. The 2-methoxy-3-amino-5-trifluoromethylbenzoic acid is recrystallized from carbon tetrachloride (M.P. 110–112). Anal. Calcd. for $C_9H_8F_3NO_3$ (mol. wt. 235.171): C, 45.95; H, 3.43; N, 5.96. Found: C, 46.02; H, 3.50; N, 5.88.

(G) *2-methoxy-3-chloro-5-trifluoromethylbenzoic acid*

3-amino-2-methoxy-5-trifluoromethylbenzoic acid (2.35 g., 0.01 m.) is added to 5 g. of 28% HCl. Cracked ice is added to this mixture to cool it to about 0°. A white solid is present and to this mixture is added a solution of sodium nitrite (0.7 g., 0.01 m.) dissolved in water (2 ml.). The temperature is held at 0–5° for 10 minutes by adding cracked ice. This diazonium solution is added quickly with stirring to a cuprous chloride solution prepared by adding a solution of sodium bisulfite (0.67 g.), sodium hydroxide (0.44 g.) and water (5 ml.) to a solution of copper sulfate (3.13 g., 0.0125 m.), sodium chloride (0.82 g., 0.014 m.) and water (10 ml.), filtering, and adding the solid to 5 g. of 28% HCl. The addition of the diazonium solution causes much foaming. The reaction mixture is stirred for ¾ hour at room temperature and 55° for 15 minutes, cooled to room temperature and filtered to get crude 2-methoxy-3-chloro - 5 - trifluoromethylbenzoic acid. This is recrystallized from water (M.P. 108.5–110). Anal. Calcd. for $C_9H_6ClF_3O_3$ (mol. wt. 254.604): C, 42.46; H, 2.37. Found: C, 42.61; H, 2.54.

(H) *2-methoxy-3-bromo-5-trifluoromethylbenzoic acid*

3-amino-2-methoxy-5-trifluoromethylbenzoic acid (2.3 g., 0.01 m.) is added to 6 ml. of 28% HBr. Cracked ice is added to this mixture to cool to about 0°. A white solid is present and to this mixture is added a solution of sodium nitrite (0.7 g., 0.01 m.) dissolved in water (2 ml.). The temperature is held 0–5° for 10 minutes by adding cracked ice. This diazonium solution is quickly added with stirring to a cuprous bromide solution prepared by adding a solution of sodium bisulfite (0.67 g.), sodium hydroxide (0.44 g.) and water (5 ml.) to a solution of copper sulfate (3.13 g., 0.013 m.), sodium bromide (1.44 g., 0.014 m.) and water (10 ml.), filtering, and adding the solid to 6 ml. of 28% HBr. The addition of the diazonium solution causes much foaming. The reaction mixture is stirred for one hour at room temperatures, 65° for 35 minutes, cooled to room temperature and filtered to get crude product. This is recrystallized from water (M.P. 110–111). Anal. Calcd. for $C_9H_6BrF_3O_3$ (mol. wt. 299.063): C, 36.14; H, 2.02. Found: C, 36.81; H, 2.70.

(I) *2-methoxy-4-trifluoromethylbenzoic acid*

(i) *2-nitro-4-trifluoromethylbenzoic acid.*—p-Carboxybenzotrifluoride (5.70 g., 0.03 m.) is dissolved in fuming $H_2SO_4$ (20–23%, 35.4 g.) and nitric acid (8.70 g., 90%) is added dropwise with stirring to this. The temperature is held at 60–65° for one hour. The reaction mixture is poured onto ice, filtered and recrystallized from water to give 2-nitro-4-trifluoromethylbenzoic acid (M.P. 109–111°). Anal. Calcd. for $C_8H_4F_3NO_4$ (mol. wt. 235.128): C, 40.87; H, 1.71; N, 5.96. Found: C, 40.99; H, 1.85; N, 6.10.

(ii) *2-amino-4-trifluoromethylbenzoic acid.*—2-nitro-4-trifluoromethylbenzoic acid (0.75 g., 0.0032 m.) is dissolved in glacial acetic acid (8.5 ml.) and reduced, using platinum oxide (8.5 mg.) as a catalyst. The mixture is then filtered through a pad of supercel and evaporated to dryness. The crude product is recrystallized from benzene (M.P. 177–8). Anal. Calcd. for $C_8H_6F_3NO_2$ (mol wt. 205.144): C, 46.85; H, 2.95; N, 6.83. Found: C, 47.18; H, 3.31; N, 6.79.

(iii) *2-chloro-4-trifluoromethylbenzoic acid.*—2-amino-4-trifluoromethylbenzoic acid (4 g., 0.02 m.) is added to 10 g. of 28% HCl. Cracked ice is added to this mixture to cool to about 0°. A white solid is present and to this mixture is added a solution of sodium nitrite (1.4 g., 0.0202 m.) dissolved in water (4 ml.). The temperature is held 0–5° for 10 minutes by adding cracked ice. This diazonium solution is quickly added with stirring to a cuprous chloride solution prepared by adding a solution of sodium bisulfite (1.34 g.), sodium hydroxide (0.88 g.) and water (10 ml.) to a solution of copper sulfate (6.26 g., 0.025 m.), sodium chloride (1.64 g., 0.028 m.) and water (20 ml.), filtering and adding the solid to 10 g. of 28% HCl. The addition of the diazonium solution causes some foaming. The reaction mixture is stirred for 50 minutes at room temperature and 60° for 15 minutes, cooled to room temperature and filtered to get crude 2-chloro-4-trifluoromethylbenzoic acid. This is recrystallized from hexane (M.P. 96–8°).

(iv) *2 - chloro - 4 - trifluoromethylbenzoic acid methyl ester.*—2-chloro-4-trifluoromethylbenzoic acid (2 g.) is dissolved in absolute methanol (30 ml.) and HCl is bubbled into the reaction mixture over a 20-minute period. The reaction mixture is then heated to 70° for ½ hour and then evaporated to dryness. This is then dissolved in benzene (30 ml.) and washed with a saturate of sodium bicarbonate solution (15 ml.) followed by $H_2O$ (15 ml.). The benzene is evaporated to dryness and the resultant oil (1.1 g.) is not purified before use in the next step.

(v) *2-methoxy-4-trifluoromethylbenzoic acid*—2-chloro-4-trifluoromethylbenzoic acid methyl ester is added to an alcoholic solution of sodium methoxide (0.5 g. Na dissolved in 10 ml. dry methanol) and refluxed for 4 hours. Water (5 ml.) is then added and refluxing is continued for 2 hours. The reaction mixture is then evaporated to dryness and the residue is dissolved into a saturated solution of sodium bicarbonate (7 ml.). This is made acid (pH3) and extracted with benzene. The crude 2-methoxy-4-trifluoromethylbenzoic acid results upon evaporating the benzene. This is sublimed at 100°/10.5 mm. (M.P. 92–3°).

(J) *2-methoxy-4-sulfamoylbenzoic acid*

Sulfamoylsalicylic acid (21.7 g. 0.1 mole) is dissolved in 100 ml. 10% NaOH. The mixture is cooled to 5° C. and 64 g. of dimethylsulfate is added slowly dropwise with good stirring. When addition is complete, 30 ml. of 40% NaOH and another 50 g. dimethyl sulfate are added. A solid sodium salt separates. This is filtered and sucked as dry as possible on the filter. The residue is taken up in water, a little ammonium hydroxide is added to destroy excess dimethyl sulfate, and the solution is acidified. There is obtained 13.5 g. of product, M.P. 171–173°. Recrystallization from 50% aqueous alcohol gives 10.9 g. of product, M.P. 172–174°. Anal. Calcd. for $C_{10}H_{13}NO_5S$: C, 46.32; H, 5.05; N, 5.40; Found: C, 46.45; H, 5.19; N, 5.37.

(K) *2-methoxy-4-dimethylsulfamoylbenzoic acid*

4-dimethylsulfamoylsalicylic acid (40 g., 0.16 mole) is dissolved in 200 ml. 10% NaOH. The mixture is cooled to 5° C. and dimethylsulfate (51 g. 0.4 mole) is added slowly, dropwise, with good stirring. After three hours, the solid sodium salt is filtered. The filtrate is treated with an additional 50 ml. of 40% NaOH and 40 g. of dimethyl sulfate. The solid sodium salt is again filtered. The combined residues are dissolved in water and the product is precipitated with acid. After recrystallization from 50% aqueous alcohol, there is obtained 27.5 g. of product, M.P. 172.5–174.5°.

EXAMPLE 10

*3-amino-1-ethyl pyrrolidine*

1-ethyl-3-hydroxy pyrrolidine (44.19 g. 0.3837 m.) and chloroform (390 cc.) are placed in a three-necked flask fitted with a reflux condenser, addition tube, magnetic stirrer, and a gas inlet tube. The mixture is saturated with hydrochloric acid gas while chilling and stirring in an ice-bath. With stirring and ice-bath cooling continuing, thionyl chloride (69.1 g.–0.575 m.) is added dropwise over 40 minutes. Stirring and chilling are continued for one hour followed by stirring at room temperature for four hours and reflux for one hour. The solvent is removed under reduced pressure over a warm water bath to leave a dark semicrystalline mass. A small portion of this material is dissolved in ethyl alcohol and treated with alcoholic picric acid. The resulting picrate is recrystallized to constant M.P. 151–2° from benzene and dried in vacuo/$P_2O_5$ at 100° for 2 hours for analyses. Calcd. for $C_{12}H_{15}O_7N_4Cl$; C, 39.73; H, 4.17; N, 15.45; Cl, 9.78. Found: C, 39.89; H, 4.29; N, 15.16; Cl, 10.05.

The remainder of the dark semicrystalline mass is dissolved in liquid $NH_3$ (250 cc.) in a glass liner and sealed in the autoclave for heating at 100° for six hours. When the autoclave has cooled, the ammonia is evaporated and the oily residue dissolved in a minimum of water. The solution is saturated with solid potassium hydroxide while chilling in an ice bath. The mixture is extracted with four portions of ether and the combined extracts dried over solid potassium hydroxide. The ether is evaporated under reduced pressure and the residue distilled at 50°/15 mm. A fraction weighing 43.81 g. is obtained. V.P.C. indicates a major component of 93% and the two minor components (6% and 1%). A dipicrate is prepared in ethyl alcohol and recrystallized repeatedly from 80% alcohol-water, M.P. dec. 256°. Dried at 110° in vacuo/$P_2O_5$ for two hours for analyses. Calcd. for $C_{18}H_{20}O_{14}N_8$: C, 37.77; H, 3.52; N, 19.58. Found: C, 37.42; H, 3.89; N, 19.36.

We claim:

1. A compound selected from the class consisting of heterocyclic amino alkyl benzamides and their pharmacologically acceptable acid salts, N-oxide and quaternary salts, said heterocyclic amino alkyl benzamides having the formula:

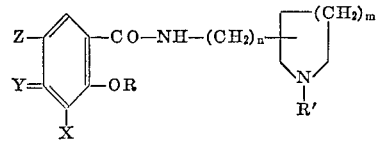

in which R is lower alkyl;

X, Y and Z are each selected from the group consisting of hydrogen, halogen, lower alkoxy, nitro, amino, lower alkylamino, di(lower alkyl)amino, lower acyl, lower alkanoylamino, cyano, sulfamoyl, N-lower-alkyl-sulfamoyl, N,N-di(lower alkyl) sulfamoyl, trihalomethyl, lower alkylthio, lower alkylsulfonyl, polyfluoro - lower-alkylthio and polyfluoro-lower-alkylsulfonyl;

R' is selected from the group consisting of lower alkyl and allyl;

$m$ is a positive whole number less than 4 and $n$ is a whole number less than two and greater than minus one.

2. A compound of claim 1 in which $m$ is 1 and $n$ is 1.

3. 1 - ethyl - 2 - (2-methoxy-5-nitrobenzamidomethyl) pyrrolidine.

4. 1 - ethyl - 2 - (2-methoxy-4-amino-5-chlorobenzamidomethyl)pyrrolidine.

5. 1 - ethyl - 2 - (2-methoxy-3,5-dichlorobenzamidomethyl)pyrrolidine hydrochloride.

6. 1 - ethyl - 2 - (2-methoxy-5-bromobenzamidomethyl) pyrrolidine oxalate.

7. A compound of claim 1 in which $m$ is 2 and $n$ is 0.

8. 1 - ethyl - 3 - (2-methoxy-4-amino-5-chlorobenzamido)piperidine.

9. A compound of claim 1 in which $m$ is 2 and $n$ is 1.

10. 1 - ethyl - 2 - (2-methoxy-4-amino-5-chlorobenzamidomethyl)piperidine.

11. 1 - ethyl - 2 - (5-sulfamoyl-2-methoxybenzamidoethyl)pyrrolidine.

References Cited

UNITED STATES PATENTS

| | | | |
|---|---|---|---|
| 2,691,025 | 10/1954 | Clinton et al. | 260—294 |
| 2,691,041 | 10/1954 | Clinton et al. | 260—294 |
| 2,748,134 | 5/1956 | Stoll et al. | 260—294 |
| 3,177,252 | 4/1965 | Thominet | 260—294 |

FOREIGN PATENTS

| | | |
|---|---|---|
| 36,CAM | 6/1963 | France. |
| 797,476 | 6/1958 | Great Britain. |

WALTER A. MODANCE, *Primary Examiner.*

A. D. SPEVACK, *Assistant Examiner.*

UNITED STATES PATENT OFFICE
CERTIFICATE OF CORRECTION

Patent No. 3,342,826 September 19, 1967

Charles S. Miller et al.

It is hereby certified that error appears in the above numbered patent requiring correction and that the said Letters Patent should read as corrected below.

Column 3, line 73, the numeral "73" should be italicized; line 75, the numeral "82" should be italicized; column 4, line 3, the numeral "83" should be italicized; column 9, line 12, for "mith" read -- with --; column 10, line 16, for "49.98" read -- 48.98 --.

Signed and sealed this 22nd day of October 1968.

(SEAL)
Attest:

Edward M. Fletcher, Jr.  
Attesting Officer

EDWARD J. BRENNER  
Commissioner of Patents

UNITED STATES PATENT OFFICE
CERTIFICATE OF CORRECTION

Patent No. 3,342,826             Dated September 19, 1967

Inventor(s) Charles S. Miller et al.

It is certified that error appears in the above-identified patent and that said Letters Patent are hereby corrected as shown below:

Column 14, lines 6 and 7, "methoxybenzamidoethyl" should read -- methoxybenzamidomethyl --.

Signed and sealed this 17th day of September 1974.

(SEAL)
Attest:

McCOY M. GIBSON JR.
Attesting Officer

C. MARSHALL DANN
Commissioner of Patents